US009313773B2

(12) United States Patent
DuBois et al.

(10) Patent No.: US 9,313,773 B2
(45) Date of Patent: Apr. 12, 2016

(54) AIRCRAFT COMMUNICATIONS SWITCHING SYSTEM

(71) Applicant: The Boeing Company, Chicago, IL (US)

(72) Inventors: Thomas A. DuBois, Media, PA (US); William Brendan Blanton, Wilmington, DE (US)

(73) Assignee: THE BOEING COMPANY, Chicago, IL (US)

(*) Notice: Subject to any disclaimer, the term of this patent is extended or adjusted under 35 U.S.C. 154(b) by 339 days.

(21) Appl. No.: 13/804,614

(22) Filed: Mar. 14, 2013

(65) Prior Publication Data

US 2014/0274180 A1 Sep. 18, 2014

(51) Int. Cl.
H04B 7/00 (2006.01)
H04W 72/04 (2009.01)
H04B 7/185 (2006.01)

(52) U.S. Cl.
CPC ........... *H04W 72/04* (2013.01); *H04B 7/18506* (2013.01); *H04B 7/18508* (2013.01)

(58) Field of Classification Search
USPC .......... 455/550.1, 552.1, 418–420, 507–509, 455/517–520; 709/223–244
See application file for complete search history.

(56) References Cited

U.S. PATENT DOCUMENTS

| 3,701,945 | A * | 10/1972 | Reginald | H04B 1/44 178/17.5 |
| 6,985,931 | B2 * | 1/2006 | Dowling | G06Q 20/04 370/401 |
| 7,236,749 | B2 * | 6/2007 | Reyes | H04R 5/02 455/517 |
| 8,532,611 | B2 * | 9/2013 | Kotzin | H04W 88/06 455/403 |
| 8,923,267 | B2 * | 12/2014 | Soliman | H04W 76/023 370/343 |

(Continued)

FOREIGN PATENT DOCUMENTS

| EP | 2015473 A2 | 1/2009 |
| EP | 2040392 A2 | 3/2009 |

(Continued)

OTHER PUBLICATIONS

"As communication necessities evolve, so do we; RT-1939(C)/ARC-210—Generation 5," Rockwell Collins, copyright 2012, 4 pages, accessed Jan. 21, 2013. http://www.rockwellcollins.com/~/media/Files/Unsecure/Products/Product%20Brochures/Communcation%20and%20Networks/Communication%20Radios/ARC-210%20Gen5%20brochure.aspx.

(Continued)

*Primary Examiner* — Fayyaz Alam
(74) *Attorney, Agent, or Firm* — Yee & Associates, P.C.

(57) ABSTRACT

A method and apparatus for managing communications. In one illustrative embodiment, an apparatus comprises a communications interface, an avionics interface, and a communications manager. The communications interface is configured to be connected to a group of wireless communications units. The avionics interface is configured to be connected to an avionics system. The communications manager is configured to identify the group of wireless communications units connected to the communications interface, receive input for a communications operation from a user interface in the avionics system, identify a number of wireless communications units in the group of wireless communications units for the communications operation from the input, and control operation of the number of wireless communications units to perform the communications operation.

21 Claims, 13 Drawing Sheets

(56) References Cited

U.S. PATENT DOCUMENTS

| | | | | |
|---|---|---|---|---|
| 2005/0085252 | A1* | 4/2005 | Reyes | H04R 5/02 455/519 |
| 2007/0021117 | A1* | 1/2007 | McKenna | H01Q 1/007 455/431 |
| 2008/0155689 | A1* | 6/2008 | Denninghoff | H04L 12/189 726/22 |

FOREIGN PATENT DOCUMENTS

| | | |
|---|---|---|
| EP | 2166678 A2 | 3/2010 |
| EP | 2378676 A1 | 10/2011 |
| WO | WO2008070374 A2 | 6/2008 |

OTHER PUBLICATIONS

"The AN/ARC-231 is an Airborne VHF/UHF/LOS and DAMA SATCOM Communications System," Raytheon Company, copyright 2011, 3 pages, accessed Jan. 21, 2013. http://www.raytheon.com/capabilities/products/arc231/index.html.

"Miniature Airborne Communications Converter," Excalibur Systems, Dec. 2011, 1 page.

Extended European Search Report, dated Aug. 26, 2015, regarding Application No. EP14154905.5, 7 pages.

\* cited by examiner

AIRCRAFT COMMUNICATIONS SWITCHING SYSTEM

BACKGROUND INFORMATION

1. Field

The present disclosure relates generally to communications and, in particular, to aircraft communications. Still more particularly, the present disclosure relates to a method and apparatus for managing communications using a group of radios.

2. Background

Communications systems in aircraft may take various forms. In particular, communications systems may include radios used by crew members of aircraft to provide voice communications between the aircraft and other entities. These communications systems are typically integrated as part of an avionics system of the aircraft.

When manufacturing aircraft, different customers may have different requirements for communications systems. For example, oftentimes, different customers may require the integration of country-specific radios in the communications systems in their aircraft. This type of requirement may be common with different military customers from different countries as well as commercial customers who need to communicate with entities in different countries.

Additionally, as new technologies become available for communications systems, a customer may desire the use of those new technologies in new aircraft manufactured for the customer. Additionally, the same customer or other customers also may request upgrades to existing aircraft to include the new communications systems. For example, as digital programmable radios become available, replacement of legacy analog radios may be requested by customers.

The cost and effort needed to make these changes may be much higher than desired. These changes often require redesigning the avionics system to integrate new communications systems.

Further, many aircraft are subject to regulations for the country in which they may be used. Changes to the design of the avionics system often involve recertification or testing under the regulations. As a result, the cost and effort for making changes to the communications system in aircraft may be greater than desired and may take more time than desired. Therefore, it would be desirable to have a method and apparatus that takes into account, at least some of the issues discussed above, as well as other possible issues.

SUMMARY

In one illustrative embodiment, an apparatus comprises a communications interface, an avionics interface, and a communications manager. The communications interface is configured to be connected to a group of wireless communications units. The avionics interface is configured to be connected to an avionics system. The communications manager is configured to identify the group of wireless communications units connected to the communications interface, receive input for a communications operation from a user interface in the avionics system, identify a number of wireless communications units in the group of wireless communications units for the communications operation from the input, and control operation of the number of wireless communications units to perform the communications operation.

In another illustrative embodiment, a method for managing communications is presented. Input for a communications operation is received from a user interface in an avionics system connected to an avionics interface. A number of wireless communications units in a group of wireless communications units is identified for the communications operation from the input. Operation of the number of wireless communications units is controlled to perform the communications operation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that with some currently used aircraft communications systems, changing radios in the communications system requires changes to the architecture of the avionics system in the aircraft.

The illustrative embodiments also recognize and take into account that these changes also include changes to the user interface used to operate the radio each time a new radio is implemented. For example, the illustrative embodiments recognize and take into account that changes to the primary flight display in an aircraft occur when a new radio is implemented in the aircraft.

Further, the illustrative embodiments recognize and take into account that changes to the avionics system of the aircraft often involve the aircraft going through a certification process. This certification process may be more costly or take longer than desired. As a result, aircraft may be out of service longer than desired.

The illustrative embodiments also recognize and take into account that a communications system may be implemented in a manner that reduces or eliminates the need for changes to the avionics system of an aircraft when making changes to the components in the communications system. For example, an apparatus may be implemented in a communications system. The apparatus may include a communications interface, an avionics interface, and a communications manager. The communications interface is configured to be connected to a group of wireless communications units. The avionics interface is configured to be connected to an avionics system. The communications manager is configured to identify the group of wireless communications units connected to the first interface, receive input for a communications operation from a user interface in the avionics system, identify a number of wireless communications units in the group of wireless communications units for the communications operation from the input, and control operation of the number of wireless communications units to perform the communications operation.

As used herein, a "number of" and a "group of" when used with reference to items means one or more items. For example, a number of wireless communications units is one or more wireless communications units. Similarly, a group of wireless communications units is one or more wireless communications units.

Figure 1:
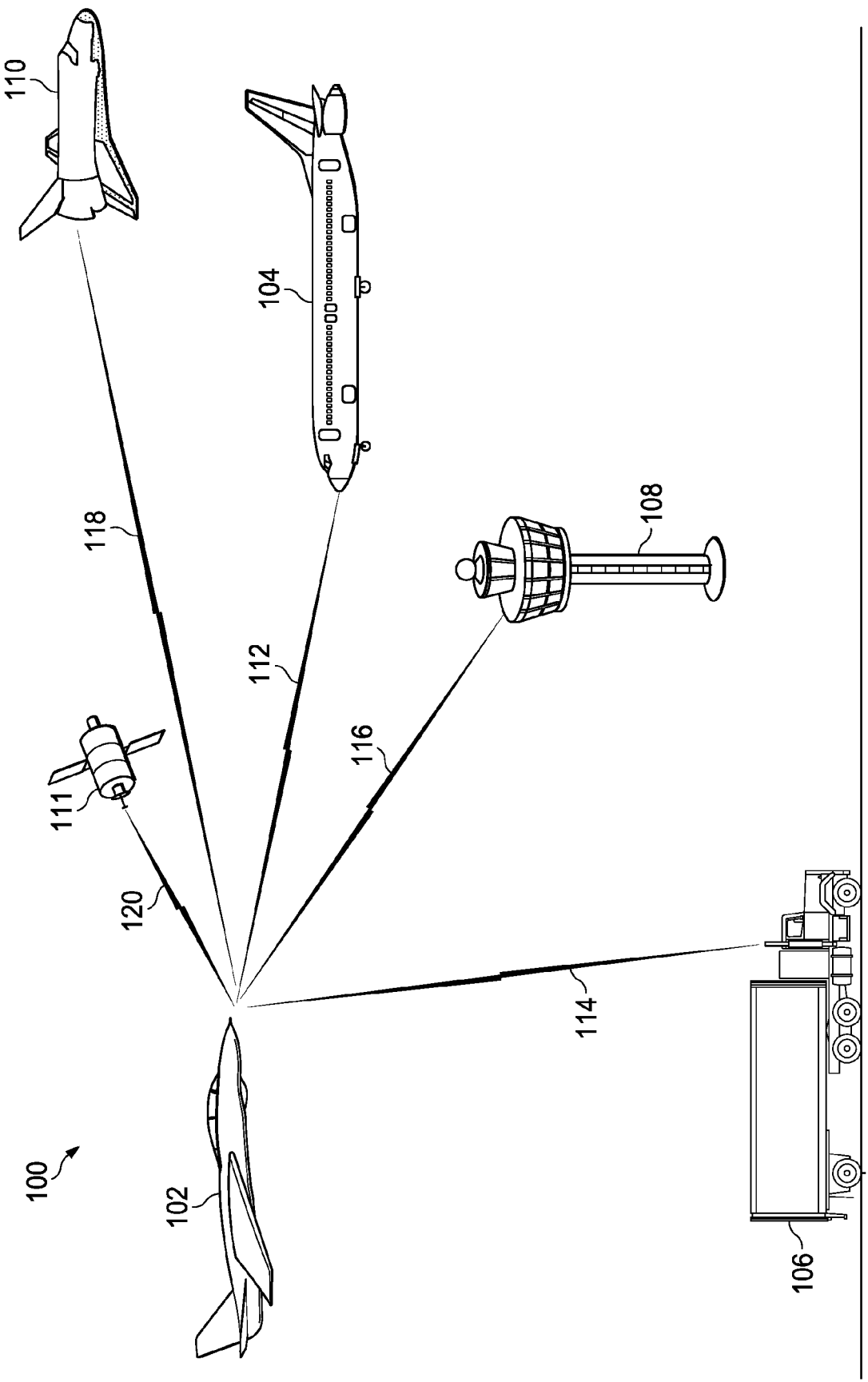
FIG. 1 is an illustration of a communications environment in accordance with an illustrative embodiment.

With reference now to the figures and, in particular, with reference to FIG. 1, an illustration of a communications environment is depicted in accordance with an illustrative embodiment. In this illustrative example, communications environment 100 includes aircraft 102. Aircraft 102 may communicate with other entities. In this illustrative example, these other entities include, for example, aircraft 104, ground vehicle 106, air traffic control tower 108, spacecraft 110, and satellite 111.

As depicted, communications may occur using communications link 112, communications link 114, communications link 116, communications link 118, and communications link 120. Communications link 112 provides for an exchange of communications between aircraft 102 and aircraft 104. Communications link 114 provides for an exchange of communications between aircraft 102 and ground vehicle 106. Communications link 116 provides for an exchange of communications between aircraft 102 and air traffic control tower 108. Communications link 118 provides for an exchange of communications between aircraft 102 and spacecraft 110. Communications link 120 provides for an exchange of communications between aircraft 102 and satellite 111. These communications may be one-way or two-way communications.

An illustrative embodiment may be implemented in aircraft 102 that allows for changes to the communications system in aircraft 102 in a manner that reduces or avoids changes to the avionics system in aircraft 102. In this manner, the time, expense, and changes to aircraft 102 may be reduced.

For example, the operator of aircraft 102 may wish to upgrade the communications system to include a country-specific radio for communicating with airports in other countries. With the use of an illustrative embodiment, the addition of the country-specific radio to aircraft 102 may occur without changing the avionics system in aircraft 102. As a result, recertification of aircraft 102 may be avoided in these illustrative examples.

Illustration of communications environment 100 in FIG. 1 is not meant to limit the manner in which other illustrative embodiments may be implemented. For example, in other illustrative examples, illustrative embodiments may be implemented in the communications system of other platforms in addition to or in place of aircraft 102. For example, an illustrative embodiment may be implemented in aircraft 104, spacecraft 110, and other suitable types of platforms that have communications systems.

Figure 2:
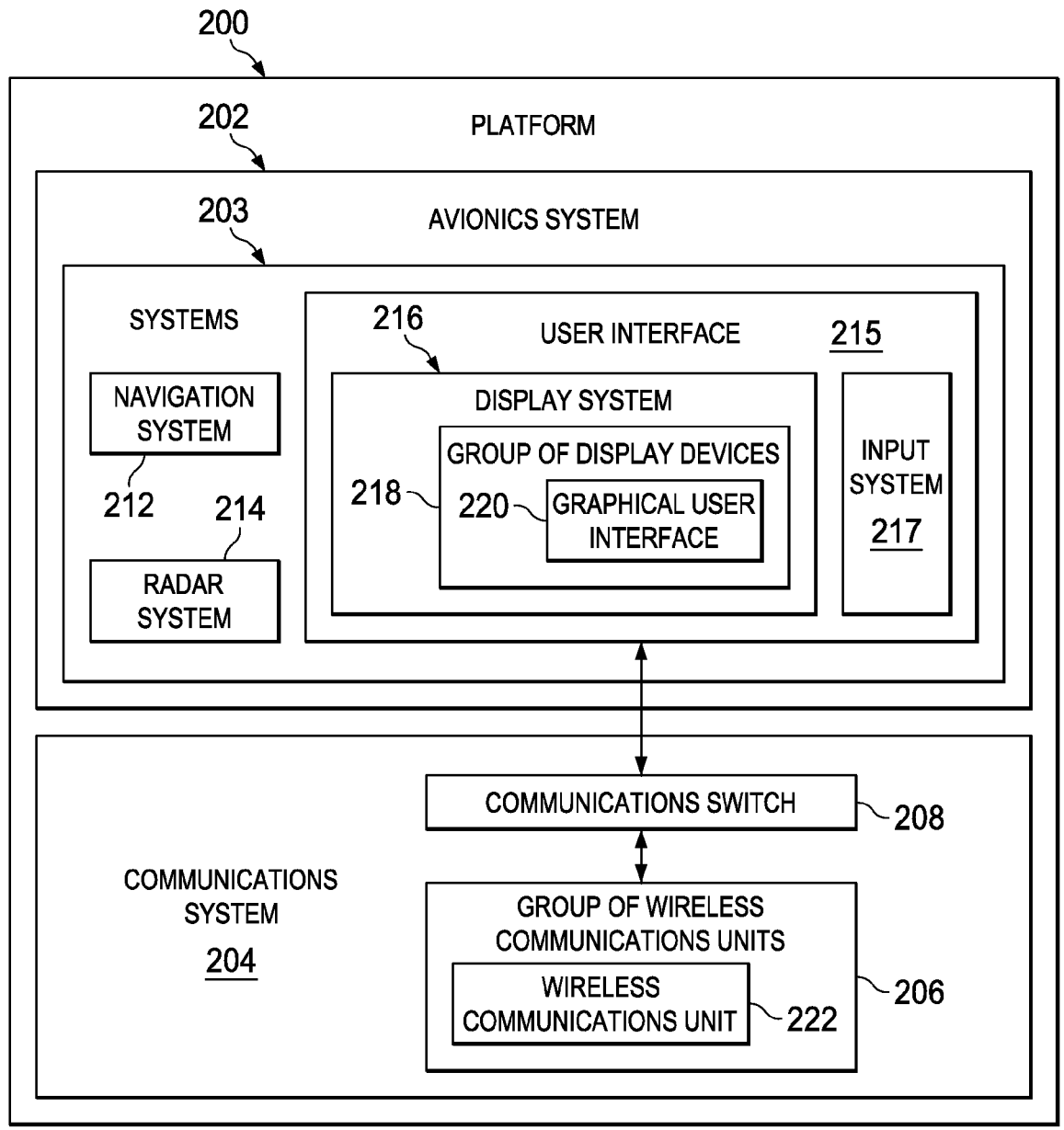
FIG. 2 is an illustration of a block diagram of a platform in accordance with an illustrative embodiment.

With reference now to FIG. 2, an illustration of a block diagram of a platform is depicted in accordance with an illustrative embodiment. In this depicted example, platform 200 is an example of a platform that may be used to implement aircraft 102 in FIG. 1.

As illustrated, platform 200 includes avionics system 202. Avionics system 202 is the electronics systems used in platform 200. As depicted, avionics system 202 may include systems 203. Systems 203 may be comprised of a number of different types of systems such as, for example, without limitation, one or more communications systems, a navigation system, a health monitoring system, and other suitable types of systems.

As depicted, platform 200 also includes communications system 204. In this illustrative example, communications system 204 includes group of wireless communications units 206. Communications system 204 may or may not be part of avionics system 202 in this illustrative example.

In these depicted examples, a wireless communications unit in group of wireless communications units 206 may take various forms. For example, a communications unit may be a receiver, transmitter, a transceiver, a radio, a data link, a telemetry device, a military standard 1553 radio, an Aeronautical Radio, Incorporated (ARINC) 429 radio, a satellite radio, an optical communications unit, and other suitable types of devices that may exchange information using wireless communications links. Additionally, communications system 204 also includes communications switch 208. Communications switch 208 is a hardware device and may include software. Communications switch 208 is configured to provide an interface between one or more of systems 203 in avionics system 202 and group of wireless communications units 206. In particular, systems 203 may include at least one of navigation system 212, radar system 214, user interface 215, and other suitable types of systems.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

In this illustrative example, user interface 215 is a hardware system and may include software. User interface 215 may be used to perform different communications operations. As depicted, user interface 215 includes display system 216 and input system 217.

Display system 216 is a hardware system in user interface 215 and may include software. Display system 216 may include group of display devices 218.

Graphical user interface 220 may be displayed on group of display devices 218 in display system 216. Graphical user interface 220 may be used to operate communications system 204 in these illustrative examples.

In this illustrative example, input system 217 is a hardware system in user interface 215. Input system 217 may be part of avionics system 202 or may be a separate component depending on the particular implementation.

Input system 217 is configured for use in communications operations. Input system 217 may receive input from operators. In this illustrative example, input system 217 may include at least one of a microphone, a speaker, a keyboard, a touchpad, a touchscreen, a mouse, a trackball, and some other suitable input device.

Although communications system 204 may be considered to be part of avionics system 202, communications system 204 is not integrated in avionics system 202 in a manner that requires changes to the architecture or design of avionics system 202. In these illustrative examples, communications switch 208 provides an ability to change the composition of group of wireless communications units 206 in a manner that reduces or avoids a need to change other parts of communications system 204 and other systems in systems 203 in avionics system 202.

In these illustrative examples, wireless communications unit 222 may be added, removed, modified, or some combination thereof with respect to group of wireless communications units 206. For example, when wireless communications unit 222 is included as part of group of wireless communications units 206, graphical user interface 220 displayed in display system 216 may remain the same. In other words, a change to graphical user interface 220 may be avoided when adding wireless communications unit 222 in group of wireless communications units 206.

By avoiding changes to graphical user interface 220, changes in the design of components in platform 200, recertification procedures for platform 200, and other processes may be reduced. Specifically, changes to the graphical user interface for operating radios and other communications devices, communications system 204 and display system 216 that would result in recertification procedures would be reduced.

For example, user interface 215 may have a standard set of screens that are displayed in graphical user interface 220. The arrangement of controls, information, and other graphics in the graphical user interface would not change. In some cases, additional graphics in the screens displayed for graphical user interface 220 may be present to identify a radio that may not be previously implemented. However, the manner in which the user interacts with graphical user interface 220 to perform various operations using communications system 204 does not change. In other words, the manner in which information and controls are displayed remain consistent when a change is made to group of wireless communications units 206.

In these illustrative examples, the changes that occur as a result of a change in group of wireless communications units 206 are made in communications switch 208. For example, software, configuration files, and other information needed to support a change to group of wireless communications units 206 are made in communications switch 208.

Figure 3:
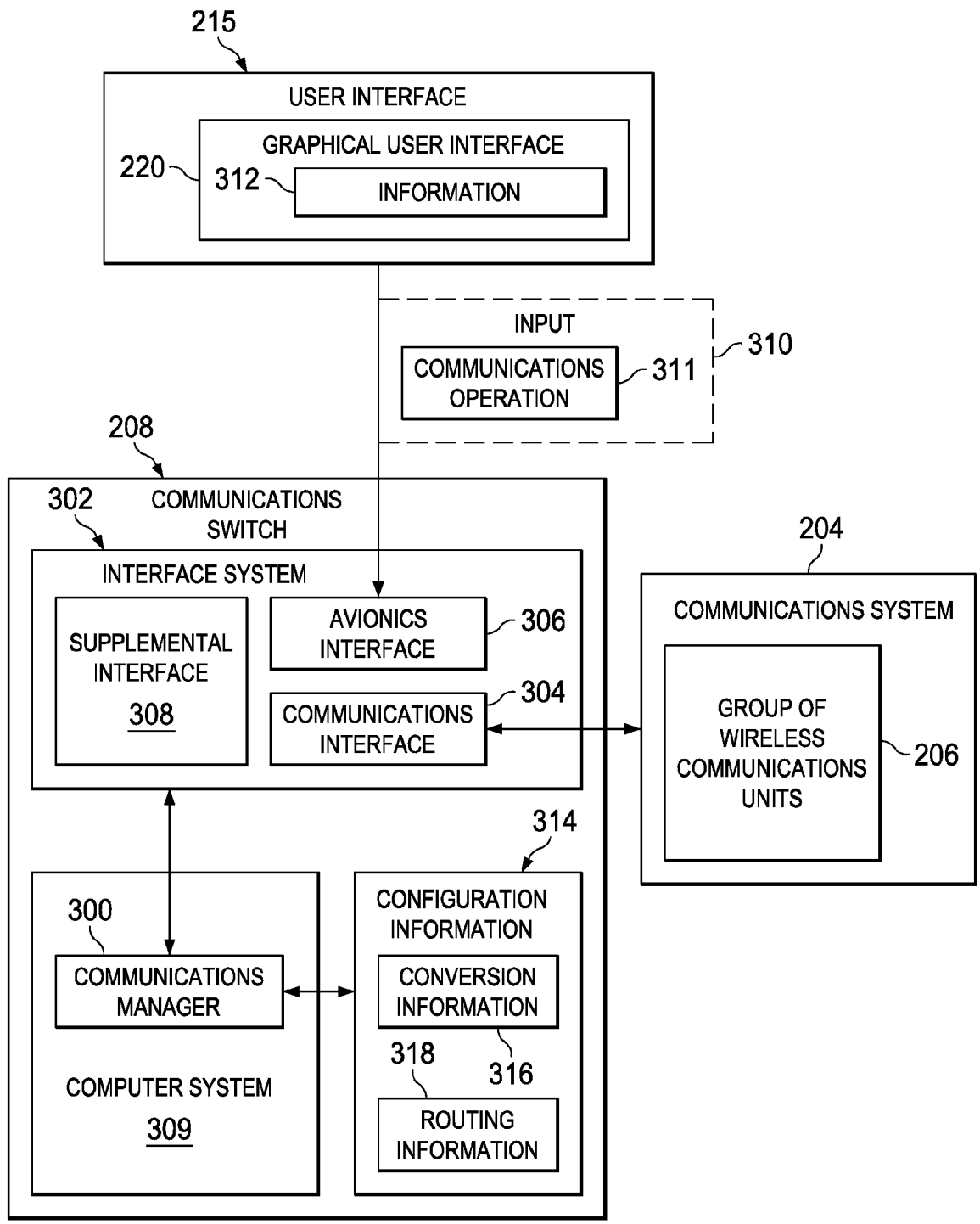
FIG. 3 is an illustration of a block diagram of a communications switch in accordance with an illustrative embodiment.

Turning next to FIG. 3, an illustration of a block diagram of a communications switch is depicted in accordance with an illustrative embodiment. In this figure, examples of components for communications switch 208 in FIG. 2 are shown.

In this particular example, communications switch 208 has a number of different components. Communications switch 208 includes communications manager 300 and interface system 302.

In this illustrative example, interface system 302 is a hardware system and includes communications interface 304, avionics interface 306, and supplemental interface 308. Communications interface 304 is configured to be connected to group of wireless communications units 206. Communications interface 304 may include at least one of a bus, a switch, a router, and other suitable components.

Avionics interface 306 is configured to be connected to avionics system 202. For example, avionics interface 306 may be connected to systems 203. In particular, avionics interface 306 may be connected to display system 216. Avionics interface 306 may include hardware components similar to those found in communications interface 304.

Supplemental interface 308 is configured to provide connections to other devices that may be located in or near platform 200. For example, supplemental interface 308 may provide a wired communications link, a wireless communications link, or some combination thereof to one or more devices. These devices may be Internet protocol-based wireless devices, such as a mobile phone, a tablet computer, a laptop computer, an electronic flight bag (EFB), and other suitable types of devices. In this particular example, supplemental interface 308 may be implemented using a router.

In this depicted example, communications manager 300 may be implemented in software, hardware, firmware or a combination of thereof. When software is used, the operations performed by communications manager 300 may be implemented in program code configured to run on a processor unit. When firmware is used, the operations performed by communications manager 300 may be implemented in program code and data and stored in persistent memory to run on a processor unit. When hardware is employed, the hardware may include circuits that operate to perform the operations in communications manager 300.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, communications manager 300 may be implemented in computer system 309. Computer system 309 comprises one or more computers. When more than one computer is present in computer system 309, those computers may be in communication with each other using a communications medium such as a network. In other examples, the medium may be a bus system.

As depicted, communications manager 300 is configured to route communications between group of wireless communications units 206. In particular, communications manager 300 is configured to identify group of wireless communications units 206 connected to communications interface 304. Communications manager 300 is also configured to receive input 310 for communications operation 311 from user interface 215. For example, communications manager 300 may receive input 310 from at least one of graphical user interface 220 and input system 217 in user interface 215.

In these illustrative examples, input 310 may take various forms. For example, input 310 may be at least one of voice, video, text, images, commands, data, and other suitable types of information. As an example, voice input may be in the form of a voice of an operator communicating with another entity. Text input may be a message entered by the operator. A command may be the selection of a control in graphical user interface 220.

Further, in this example, the operator entering input 310 may be any person on platform 200. For example, the operator may be a crew member, a passenger, or some other suitable person.

In these illustrative examples, graphical user interface 220 is configured to be a common interface. In other words, graphical user interface 220 does not change for different wireless communications units in group of wireless communications units 206.

For example, the manner in which information 312 about communications is presented by graphical user interface 220 is the same regardless of which wireless communications unit in group of wireless communications units 206 is used. Additionally, if changes are made to wireless communications units in group of wireless communications units 206, graphical user interface 220 does not change the manner in which information 312 is displayed in these illustrative examples. In other words, the same screens may be used to display information 312 for the different wireless communications units that may be located in group of wireless communications units 206.

As another example, the controls and the manner in which input 310 is entered into graphical user interface 220 also do not change when a different wireless communications unit is used. In other words, the same controls in the same screens may be used by an operator to perform communications operations regardless of which wireless communications unit is employed.

In operation, a number of wireless communications units in group of wireless communications units 206 are identified by communications manager 300 for communications operation 311 in input 310. In these illustrative examples, communications manager 300 is configured to detect the presence of a wireless communications unit connected to communications interface 304. The detection of a presence of a wireless communications unit may be made using any currently existing protocol for detecting the presence of devices that may be connected to an interface such as a bus, a port, or some other connector.

Communications manager 300 controls the operation of the number of communications units identified to perform communications operation 311. Input 310 in this illustrative example does not need to be specific to a particular protocol or format used by a wireless communications unit in group of wireless communications units 206.

For example, input 310 may be in a first format when received from an operator using graphical user interface 220. Communications manager 300 identifies a second format for sending input 310 to group of wireless communications units 206. The second format may be a protocol used by the wireless communications unit receiving input 310.

Further, if input 310 is to be sent to more than one wireless communications unit in group of wireless communications units 206, the format for each of those wireless communications units is identified by communications manager 300. Communications manager 300 then converts the first format into the formats used by the wireless communications units identified for input 310.

For example, input 310 may include voice input and data. In this illustrative example, the voice input may be in a first format such as, for example, analog or digital form. The data may be in a second format such as, for example, text. The voice input may then be sent through a first wireless communications unit, and the data may be sent through a second wireless communications unit. Communications manager 300 is configured to convert the voice input in input 310 in the first format into a third format used by the first wireless communications unit. Communications manager 300 is also configured to convert the data in input 310 in the second format into a fourth format used by the second wireless communications unit. Of course, the third format and fourth format may be the same format or different formats, depending on the particular implementation. In other words, depending on the number of and type of wireless communications units used, input 310 may be converted into one format, three formats, twelve formats, or other numbers of formats to be used with one or more wireless communications units in group of wireless communications units 206.

In these illustrative examples, the format for a destination wireless communications unit may be identified in a number of different ways. In one example, configuration information 314 may be used. In particular, conversion information 316 in configuration information 314 may be used to identify the format for the wireless communications unit that is to receive input 310. Configuration information 314 may also identify the conversion that is to be performed. For example, conversion information 316 may identify a converter, translator, or some other process that may be used to convert input 310 from a first format to a second format used by the wireless communications unit that is identified for receiving input 310.

Configuration information 314 may be stored in a number of different ways. For example, configuration information 314 may be stored in at least one of a configuration file, a database, a spreadsheet, a linked list, or some other suitable data structure.

Communications manager 300 is also configured to send input 310 to the appropriate wireless communications unit. In this illustrative example, the routing to the wireless communications unit also may be identified from configuration information 314. In particular, routing information 318 in configuration information 314 may be used to identify the wireless communications unit in group of wireless communications units 206 that is to receive input 310.

Communications manager 300 uses information about wireless communications units in group of wireless communications units 206 to determine which wireless communication units can be used to transmit messages. This identification of available wireless communications units may be made based on the features of those messages. For example, communications manager 300 may only select wireless communications units with sufficient bandwidth to transmit video.

In cases of multiple transmission alternatives, communications manager 300 may select a best wireless communications unit based on a number of factors. For example, these factors may include at least one of a calculated figure of merit and one or more mission constraints. The calculated figure of merit may be associated with destination, timeliness, broadcast or point-to-point. Mission constraints may include, for example, a requirement for encryption, a requirement for radio silence, and ability to exploit other radio systems not on the aircraft to achieve the transmission to the desired destination using one or more intermediate hops, and other suitable constraints.

Figure 4:
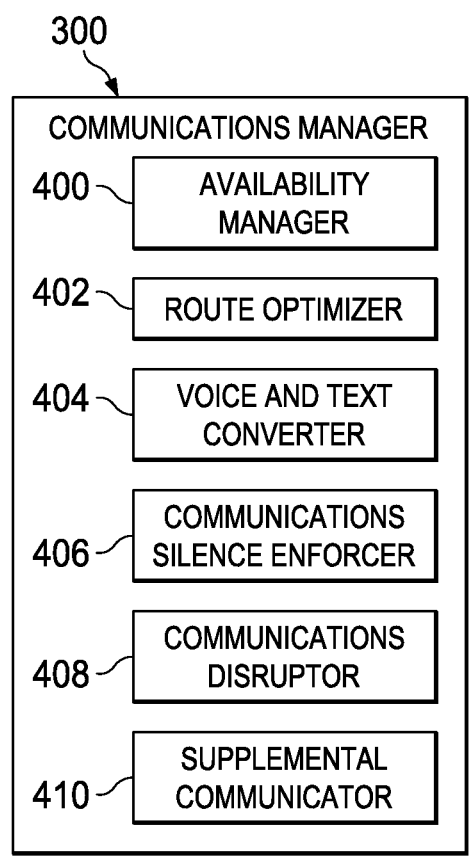
FIG. 4 is an illustration of a block diagram of functions that may be performed by a communications manager in accordance with an illustrative embodiment.

Turning now to FIG. 4, an illustration of a block diagram of functions that may be performed by a communications manager is depicted in accordance with an illustrative embodiment. In this figure, a number of different functions that may be implemented in communications manager 300 are depicted.

As illustrated, additional functions that may be implemented by communications manager 300 include at least one of availability manager 400, route optimizer 402, voice and text converter 404, communications silence enforcer 406, communications disrupter 408, and supplemental communicator 410. These different functions may be implemented as hardware, software, or some combination thereof.

Availability manager 400 is configured to identify entities with which communications may be exchanged. For example, availability manager 400 may be configured to identify a number of entities that are available for communications from a group of entities and display the number of entities available for communications on graphical user interface 220. The group of entities may be identified through identifiers assigned to the entities. As one example, graphical user interface 220 may have icons for each different type of entity in the group of entities. Availability manager 400 may change the display of these icons on graphical user interface 220 depending on whether each entity or group of entities is available for communications with an operator on platform 200. Of course, the group of entities available for communications may be identified in other ways, depending on the particular implementation.

Availability manager 400 is configured to discover the number of entities in this example. This discovery may be made in a number of different ways. For example, the number of entities may be any entity that is identified as being online.

For example, availability manager 400 may identify the group of entities available for communications when information about the entities available for communications includes Internet protocol addresses for those entities. Those Internet protocol addresses may be used to determine whether any of the entities are available for communications.

Further, the identification of the group of entities may be updated. This update may be made prior to the use of communications switch 208, dynamically during operation of communications switch 208, or some combination thereof.

Route optimizer 402 is configured to route a communication to a destination. In these illustrative examples, route optimizer 402 may include a topology of connections. In this illustrative example, the topology of connections is a map of connections in a network or other type of communications system. For example, route optimizer 402 may include a figure of merit calculator. This figure of merit calculator may use various values for attributes to identify the best route for a particular communication. In these depicted examples, attributes may include, for example, without limitation, at least one of message priority, bandwidth, type, form, reach, mission constraints, and other suitable types of attributes. A type of communication may be, for example, video, data, voice, or some other suitable type of communication. A form of communication may be, for example, analog or digital. Reach of the communication may be, for example, broadcast, point-to-point, selected list, and other types of transmission. Mission constraints for the communication may be, for example, radio silence, encryption, and other types of constraints that may be placed on a particular mission.

In these illustrative examples, routing optimization performed by route optimizer 402 may be made in a manner that reduces overall use of resources in a network. For example, the route may be through a number of hops to the destination that results in the lowest use of resources. In other illustrative examples, the route may be selected to provide the fastest routing of the communication.

In one illustrative example, platform 200 may take the form of a rotorcraft. Route optimizer 402 is configured to know when a satellite communications link established by a satellite radio in the rotorcraft may be affected by rotor modulation. As a result, communications to a destination may be sent along the route at a desired time to avoid interference with that communication by rotor modulation. Route optimizer 402 also may be configured to use an optical communications unit to establish a number of line of sight communications links.

As depicted, voice and text converter 404 is configured to convert voice communications into text, text communications into voice, or some combination thereof. For example, voice communications may be converted into text when the use of a radio is not as reliable as desired. Instead, communications may be sent in the form of text over a different wireless communications unit that is configured to send messages in the form of text.

In these illustrative examples, communications silence enforcer 406 is configured to restrict the transmission of communications when needed. For example, radio silence may be specified for periods of time during a mission. Communications silence enforcer 406 is configured to prevent the transmission of a communication such as a voice communication for the portion of a mission when radio silence is required. The restriction of a communication may be implemented for specific frequency bands, for specific entities, when a platform is located in specific geographical areas, or may be implemented for any type of communication for a specified period of time.

As depicted, communications disrupter 408 is configured to disrupt communications in an area of interest. In this illustrative example, communications disrupter 408 may disrupt digital communications such as those over a network. This disruption may be initiated using various techniques such as a denial of service attack or other types of cyber-attacks.

In this illustrative example, communications disrupter 408 may be initiated by an operator. In other illustrative examples, communications disrupter 408 may be initiated automatically. For example, an automatic initiation of communications disrupter 408 may occur in response to detecting an enemy air defense system that relies on Internet protocol connectivity over a network.

In these depicted examples, supplemental communicator 410 is configured to provide connectivity for additional devices. Supplemental communicator 410 may include a router in addition to software to manage the connection of additional devices in these illustrative examples.

The devices connected to supplemental communicator 410 may be, for example, devices used by the crew members of an aircraft. In other examples, the devices connected to supplemental communicator 410 may be used by passengers on the aircraft. These devices may be connected by at least one of a wired connection and a wireless connection. The devices connected to supplemental communicator 410 may include, for example, without limitation, a mobile phone, a tablet computer, a laptop computer, an electronic flight bag (EFB), and other suitable types of devices.

Supplemental communicator 410 also may control which devices have access to each other. In these illustrative examples, supplemental communicator 410 may be used to provide communications between passengers, crew members, or other people on an aircraft. The communications may be, for example, without limitation, at least one of voice communications, text messages, email messages, videoconferencing, and other suitable types of communications. Additionally, supplemental communicator 410 may allow for voice communications or other types of communications to be made to entities outside of the aircraft.

The illustration of platform 200 and the different components in platform 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 200 has been described with respect to aircraft 102 in FIG. 1, platform 200 may be any platform in which avionics system 202 may be present. For example, platform 200 may also take the form of an artificial satellite, a spacecraft, or other suitable types of platforms. Further, although aircraft 102 has been shown as taking the form of an airplane, aircraft 102 may take other forms such as a rotorcraft.

As another illustrative example, seven functions for communications manager 300 are illustrated in FIG. 4. In other illustrative examples, communications manager 300 may include a subset of those functions or may include other functions in addition to or in place of the ones depicted.

Figure 5:
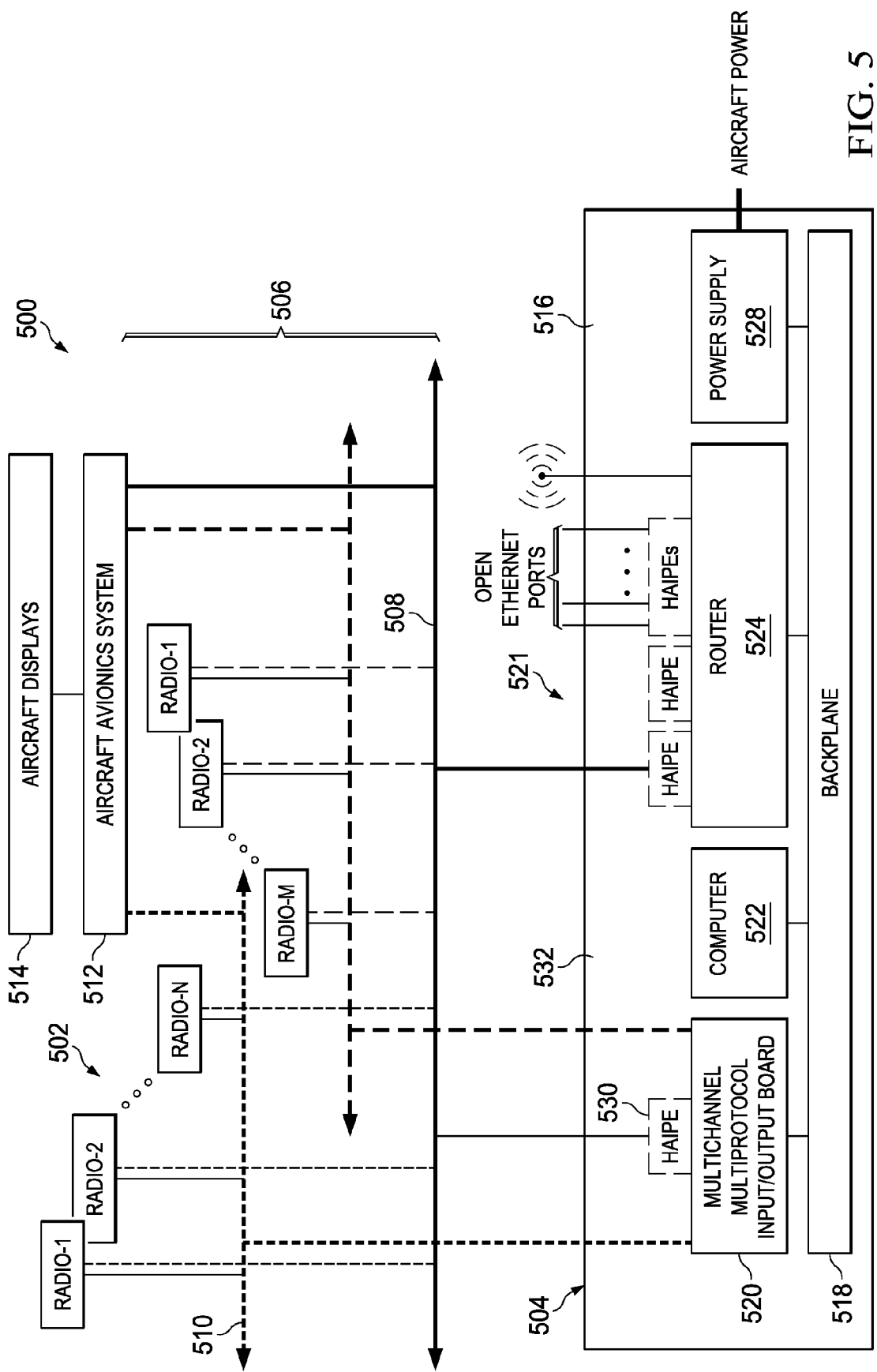
FIG. 5 is an illustration of a communications system in accordance with an illustrative embodiment.

Turning now to FIG. 5, an illustration of a communications system is depicted in accordance with an illustrative embodiment. In this illustrative example, communications system 500 is an example of one implementation for communications system 204 in FIG. 2.

As depicted, radios 502 are one example of an implementation for group of wireless communications units 206 in FIG. 2. Radios 502 are connected to communications switch 504 through interface system 506. Interface system 506 includes network 508 and bus system 510. As depicted, network 508 may be an Ethernet network with switches. Bus system 510 may be a bus system following a military standard 1553 radio, an Aeronautical Radio, Incorporated (ARINC) 429 radio, or some other system.

In this depicted example, interface system 506 is also connected to aircraft avionics system 512. Aircraft displays 514 are examples of components in a user interface in the aircraft such as user interface 215 in FIG. 2.

In this illustrative example, communications switch 504 includes a number of different components. As depicted, communications switch 504 includes housing 516, backplane 518, multichannel multiprotocol input/output board 520, encryption devices 521, computer 522, router 524, and power supply 528.

Housing 516 is configured to hold the different components in communications switch 504. Housing 516 may be made of any material that provides desired characteristics such as those for heat, rigidity, and other suitable characteristics.

Backplane 518 is a hardware device configured to provide electrical connectivity between components. In this example, backplane 518 provides electrical connectivity for multichannel multiprotocol input/output board 520, computer 522, router 524, and power supply 528.

Multichannel multiprotocol input/output board 520 is configured to provide an interface to radios 502 and aircraft avionics system 512. In this example, multichannel multiprotocol input/output board 520 has communications interface 530 and avionics interface 532. Communications interface 530 is an example of communications interface 304 in FIG. 3, and avionics interface 532 is an example of avionics interface 306 in FIG. 3. In this illustrative example, multichannel multiprotocol input/output board 520 may be implemented using any currently available input/output board that is capable of receiving and sending information, such as input, using different protocols to and from different devices.

Further, multichannel multiprotocol input/output board 520 may be connected to one of encryption devices 521. Encryption devices 521 may be high assurance internet protocol encryptors (HAIPEs). High assurance internet protocol encryptors provide encryption capabilities that comply with one or more National Security Agency's standards for security. In other words, encryption devices 521 that are high assurance internet protocol encryptors are certified by the National Security Agency for use in cryptographically securing classified government information. As a result, communications systems equipped with high assurance internet protocol encryptors may be used for military communications. Thus, the use of high assurance internet protocol encryptors for encryption devices 521 provides a desired level of security for military communications over radios 502. Of course, in other illustrative examples, other types of encryption devices may be used for encryption devices 521, depending on the particular implementation.

Computer 522 is an example of a hardware device that may be used to implement various functions in communications switch 504. For example, computer 522 may implement communications manager 300 in FIG. 3. Additionally, computer 522 also may implement other functions such as those illustrated in FIG. 4.

Router 524 is a hardware device that provides an additional interface for other devices. Router 524 is an example of supplemental interface 308 in FIG. 3. These devices may be wireless or wired devices depending on the particular implementation. In this example, the other devices may take the form of Internet protocol-based wireless devices, such as, for example, without limitation, a mobile phone, a tablet computer, or some other suitable device.

Power supply 528 is a hardware device that is configured to provide power to components in communications switch 504 such as multichannel multiprotocol input/output board 520, computer 522, and router 524. Power supply 528 is configured to be connected to power in an aircraft and may supply power to the different components at a desired voltage and current.

The illustration of communications system 500 and aircraft avionics system 512 are provided only as an example of one manner in which these different components may be implemented. Other implementations may have other configurations and may contain other components in addition to or in place of ones depicted in this illustrative example.

Figure 6:
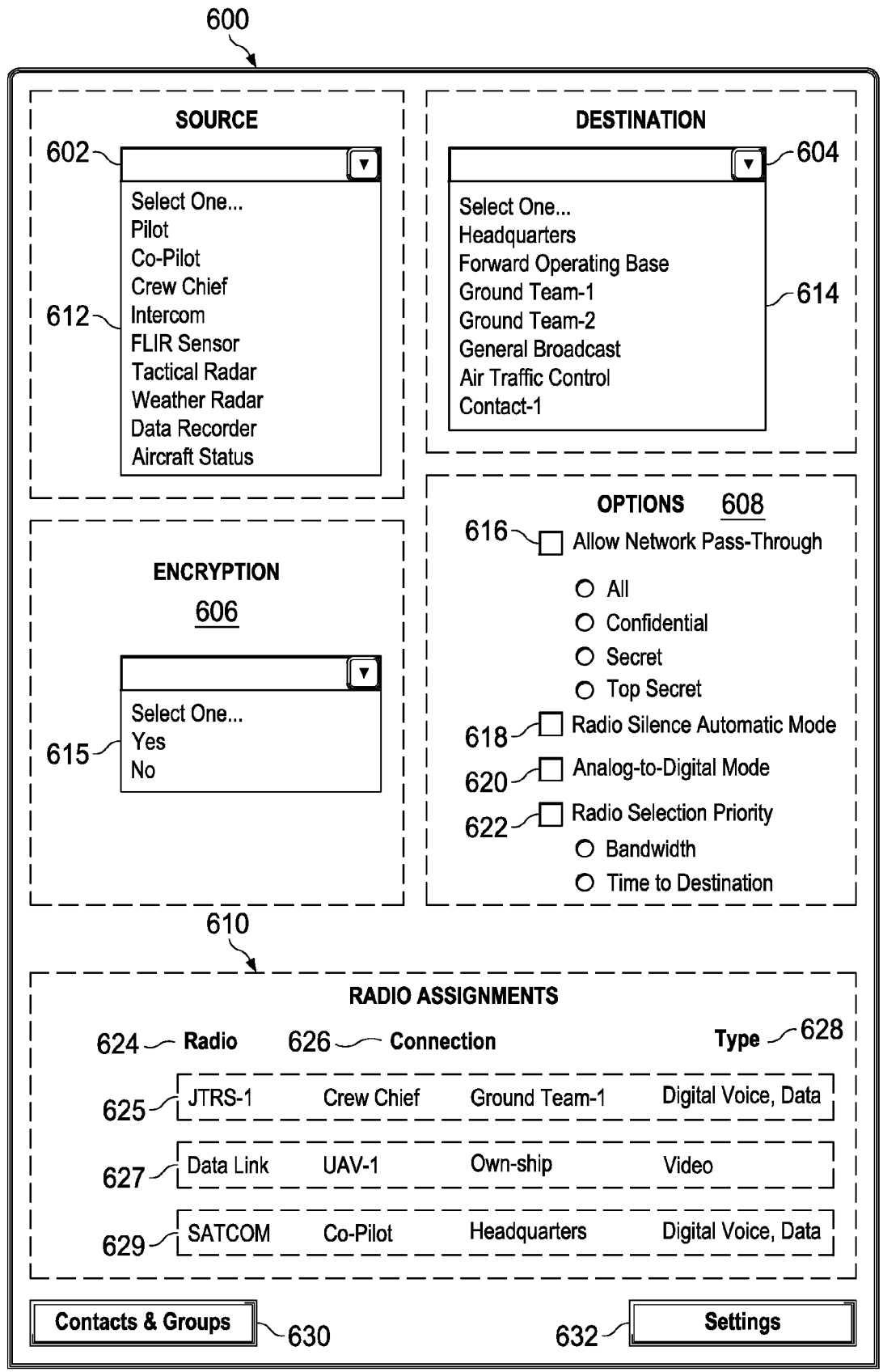
FIG. 6 is an illustration of a screen displayed in a graphical user interface in accordance with an illustrative embodiment.

With reference next to FIG. 6, an illustration of a screen displayed in a graphical user interface is depicted in accordance with an illustrative embodiment. In this depicted example, screen 600 is an example of a screen that may be displayed by graphical user interface 220 in FIG. 2 and FIG. 3.

In this illustrative example, screen 600 has a number of different components. As depicted, screen 600 includes source 602, destination 604, encryption 606, options 608, and radio assignments 610.

Source 602 is configured to receive user input from an operator selecting a source for a communication to be sent using a wireless communications unit. In these illustrative examples, wireless communications units take the form of radios. The selection of the source may be made through drop-down menu 612.

In a similar fashion, destination 604 is configured to select a destination for the communication. In this illustrative example, the destination may be selected through drop-down menu 614.

Encryption 606 allows a user to enter user input to determine whether the communications is to be encrypted. The selection may be made using drop-down menu 615 in this illustrative example.

Additionally, options 608 allow an operator to enter user input to select options with respect to the communications. In this example, the options may be network pass-through 616, radio silence automatic mode 618, analog-to-digital mode 620, and radio selection priority 622.

As depicted, radio assignments 610 identify radio 624, connection 626, and type 628. Radio 624 identifies the radio that may be used for the communication. Connection 626 identifies an entity with which the radio is used to establish a communications link. Type 628 is the medium for the communication.

In these illustrative examples, row 625, row 627, and row 629 are entries for radios. Each radio in row 625, row 627, and row 629 that is identified in radio 624 has a connection in connection 626, and a type in type 628.

Additionally, screen 600 also may have other controls and information. For example, screen 600 may have control 630. Selecting control 630 allows an operator to view, select, or view and select contacts and groups with which the operator may establish communications. Selection of this control may cause the display of another screen or a pop up window or other graphical interface.

As another illustrative example, control 632 in screen 600 is a settings control. Selection of this control may display another screen, pop-up window, or other graphical user interface to receive user input on various settings for the communications system. This graphical user interface also may receive user input to select settings.

In the illustrative example, screen 600 is configured to be used to display information received in user input regardless of the type of radios that may be present in the communications system. This information may be, for example, information 312 in FIG. 3. The user input may be, for example, input 310 in FIG. 3.

If a radio is added, removed, or changed out for another radio, a change to screen 600 is unnecessary in the different illustrative examples. In other words, the design of screen 600 does not need to change if the composition of a group of radios changes. This lack of change to the graphical user interface may apply when other types of wireless communications units, replacing radios with wireless communications units, or other changes to the communications system are made.

For example, source 602, destination 604, encryption 606, options 608, radio assignments 610, control 630, and control 632 are displayed in screen 600 regardless of what radios are used in this example. The information displayed may change based on the particular situation, but the look and feel in the design of screen 600 in the graphical user interface remains the same.

In other words, changes to screen 600 that may require an operator to change the manner in which the operator interacts with screen 600 for the graphical user interface are avoided. Thus, the operator may continue to operate the communications system without having to learn new controls or find changes in the locations of controls. The manner in which the operator interacts with the communications system remains the same regardless of the makeup of radios in the communications system for this example.

Instead, the changes needed to handle different radios or other wireless communications units are managed through changes in communications switch 208. These changes may take the form of changes to software, configuration information, and other suitable changes. As a result, the manner in which an operator uses an indication system remains unaffected in the illustrative examples.

The illustration of screen 600 is only provided as an example of one manner in which information may be displayed on graphical user interface 220 in FIG. 2. The illustration of screen 600 is not meant to limit the manner in which graphical user interface 220 may be organized or designed. For example, other types of controls may be used. Instead of the drop-down list, a pop-up window may be used. Dials, sliders, and other suitable controls may be used in addition to or in place of the ones illustrated in this illustrative example.

Figure 7:
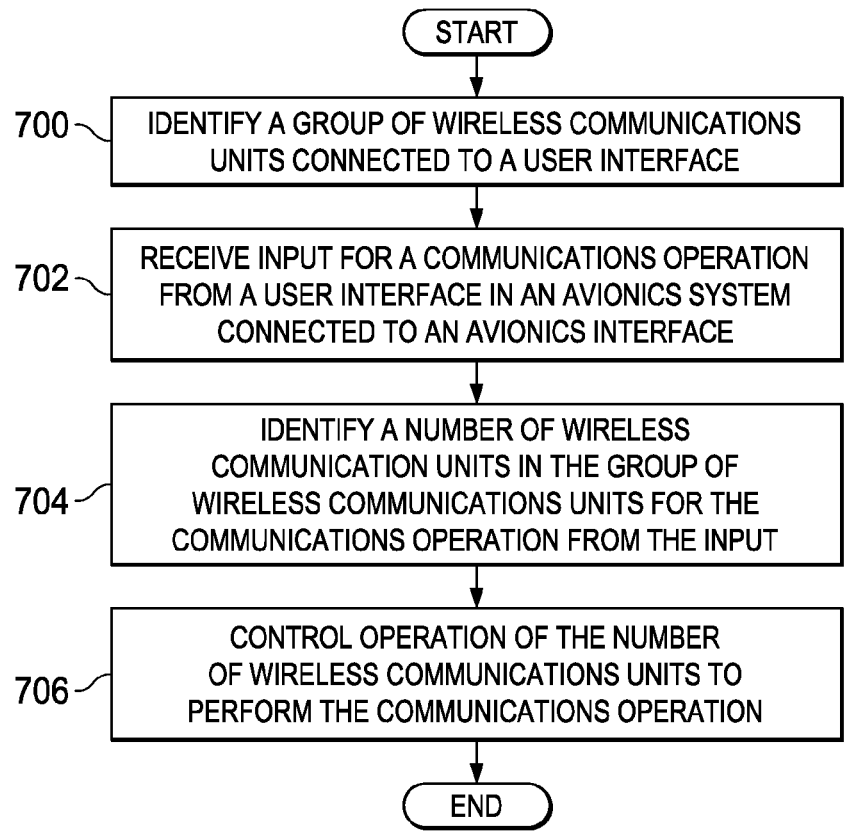
FIG. 7 is an illustration of a flowchart of a process for managing communications in accordance with an illustrative embodiment.

With reference now to FIG. 7, an illustration of a flowchart of a process for managing communications is depicted in accordance with an illustrative embodiment. The process illustrated in FIG. 7 may be implemented in platform 200 in FIG. 2. In particular, the processes may be implemented in communications switch 208 in FIG. 2.

The process begins by identifying a group of wireless communications units connected to a user interface (operation 700). The process receives input for a communications operation from a user interface in an avionics system connected to an avionics interface (operation 702).

The process identifies a number of wireless communication units in the group of wireless communications units for the communications operation from the input (operation 704). Next, the process controls operation of the number of wireless communications units to perform the communications operation (operation 706) with the process terminating thereafter.

Figure 8:
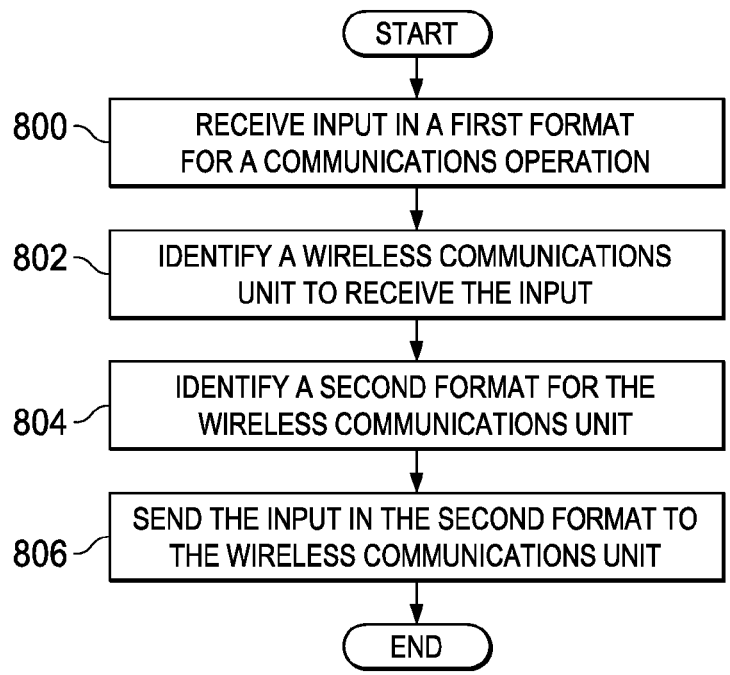
FIG. 8 is an illustration of a flowchart of a process for managing input received for a communications operation in accordance with an illustrative embodiment.

Turning now to FIG. 8, an illustration of a flowchart of a process for managing input received for a communications operation is depicted in accordance with an illustrative embodiment. The process illustrated in FIG. 8 may be implemented in communications manager 300 in FIG. 3.

The process begins by receiving input in a first format for a communications operation (operation 800). In this illustrative example, the first format is a format configured for use by the user interface. For example, the first format may include a format for a command generated in response to the manipulation of controls on a graphical user interface in the user interface. For example, the command may be to initiate communication with a particular entity.

The process then identifies a wireless communications unit to receive the input (operation 802). The process then identifies a second format for the wireless communications unit (operation 804). The second format may be a different format for the command. The command may be placed into the second format that is used by the wireless communications unit. As another example, if the input is voice in a digital form, the input may be changed to voice in an analog form if the wireless communications unit is configured to receive voice in an analog form.

Next, the process sends the input in the second format to the wireless communications unit (operation 806). The process terminates thereafter.

In this illustrative example, if multiple wireless communications units are to receive the input, the input may be sent in a number of different formats to each respective wireless communications unit. In other words, the process illustrated in FIG. 8 may occur with respect to one or more wireless communications units receiving the input, depending on the particular implementation. For example, if the input is a command sent through a first communications unit and a second communications unit, the process will identify a second format for the first communications unit and send the command to the first wireless communications unit in the second format.

In these illustrative examples, the format used by the second wireless communications unit may be the same or different than the format used by the first wireless communications unit. If the format is different, the process will identify a format for the second wireless communications unit in operation 804. The input may then be sent in the appropriate format to both communications units substantially concurrently or otherwise.

Figure 9:
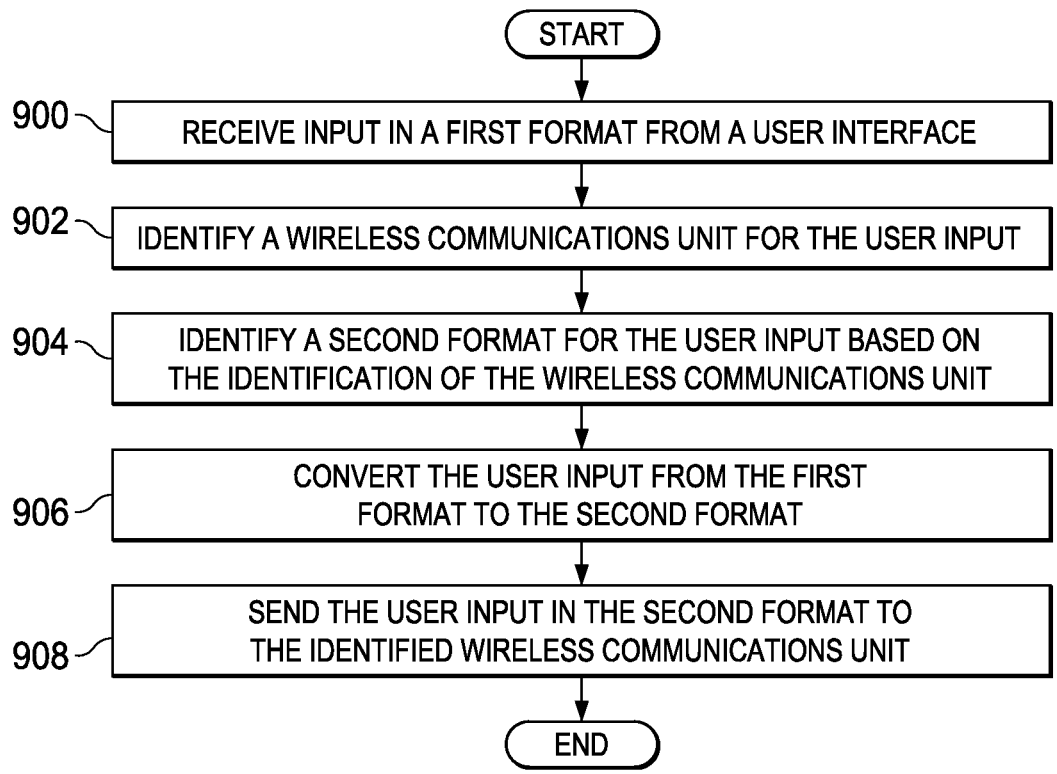
FIG. 9 is an illustration of a flowchart of a process for identifying a wireless communications unit for a communications operation in accordance with an illustrative embodiment.

Turning next to FIG. 9, an illustration of a flowchart of a process for identifying a wireless communications unit for a communications operation is depicted in accordance with an illustrative embodiment. The process illustrated in FIG. 9 may be implemented in communications manager 300 in FIG. 3.

The process begins by receiving input in a first format from a user interface (operation 900). A wireless communications unit is identified for the user input (operation 902).

A second format for the user input is identified based on the identification of the wireless communications unit (operation 904). The process then converts the user input from the first format to the second format (operation 906). The user input may be converted into different formats using, for example, voice and text converter 404 in FIG. 4, or other suitable types of converters. The process then sends the user input in the second format to the identified wireless communications unit (operation 908) with the process terminating thereafter.

Figure 10:
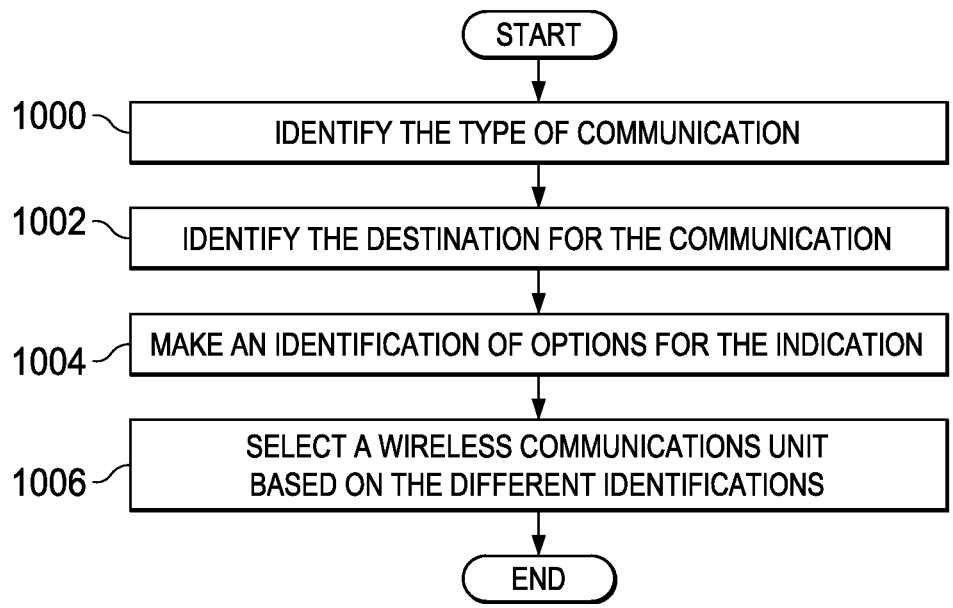
FIG. 10 is an illustration of a flowchart of a process for identifying a wireless communications unit for a communication in accordance with an illustrative embodiment.

Turning next to FIG. 10, an illustration of a flowchart of a process for identifying a wireless communications unit for a communication is depicted in accordance with an illustrative embodiment. The operations illustrated in this flowchart are examples of operations that may be used to implement operation 802 in FIG. 8. The user input in operation 802 may be, for example, the communication, a selection of a destination, a selection of options, and other types of user input.

The process begins by identifying the type of communication (operation 1000). For example, if the communication is voice, a first wireless communications unit may be selected. If the communication is text, another wireless communications unit may be selected. Further, user input selecting a destination for the communication also may be used to identify the wireless communications unit for use in sending the communication.

The process then identifies the destination for the communication (operation 1002). In this illustrative example, the destination may be an entity such as a person, group, location, or other suitable destination.

Next, an identification of options for the indication is made (operation 1004). These options may be, for example, a priority for the communication, whether the communication should be sent in analog or digital form, pass through networks, and other suitable options. For example, the priority may be selected based on time to the destination, bandwidth desired, and other suitable factors. The selection of pass through networks may indicate whether the transmission of the communication can be through any network or networks that support the transmission of information on a confidential level, secret level, top-secret level, or some other level of confidentiality.

The process then selects a wireless communications unit based on the different identifications (operation 1006). The process terminates thereafter.

Figure 11:
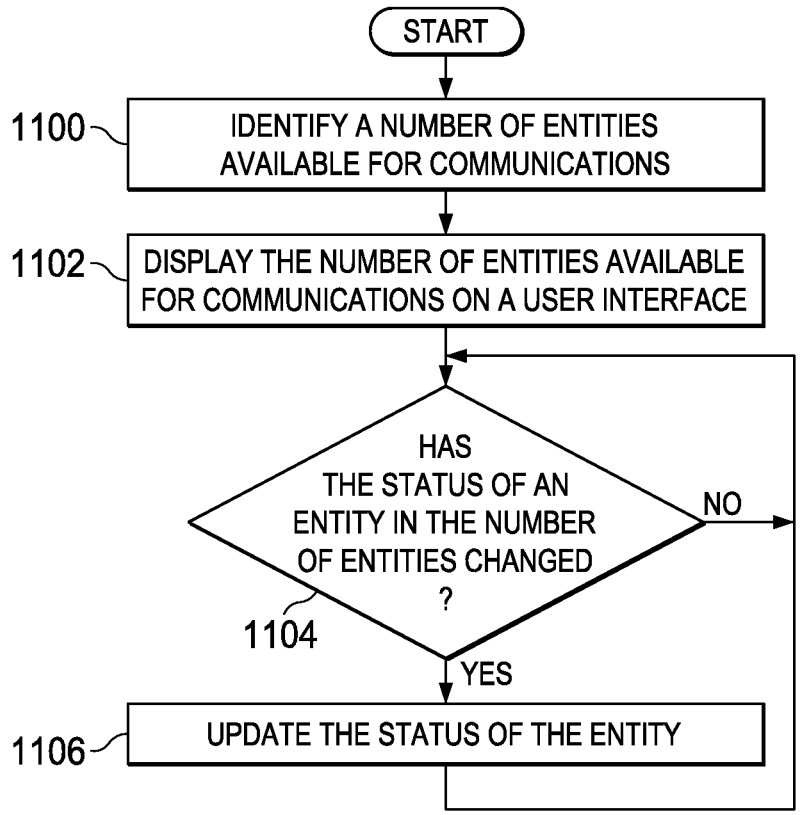
FIG. 11 is an illustration of a flowchart of a process for identifying a number of entities available for communications in accordance with an illustrative embodiment.

Turning now to FIG. 11, an illustration of a flowchart of a process for identifying a number of entities available for communications is depicted in accordance with an illustrative embodiment. The process illustrated in FIG. 11 may be implemented in communications manager 300 in FIG. 3.

The process begins by identifying a number of entities available for communications (operation 1100). This number of entities may be part of a group of entities.

Next, the process displays the number of entities available for communications on a user interface (operation 1102). These entities may be displayed using icons or other suitable graphical indicators.

A determination is made as to whether the status of an entity in the number of entities has changed (operation 1104). If the status of an entity in the number of entities has changed, the process updates the status of the entity (operation 1106). This update may occur by changing the icon or other graphical indicator corresponding to the entity, or by changing the user interface in some other suitable manner. If the status of the entity in the number of entities has not changed, the process returns to operation 1104 as described above.

Figure 12:
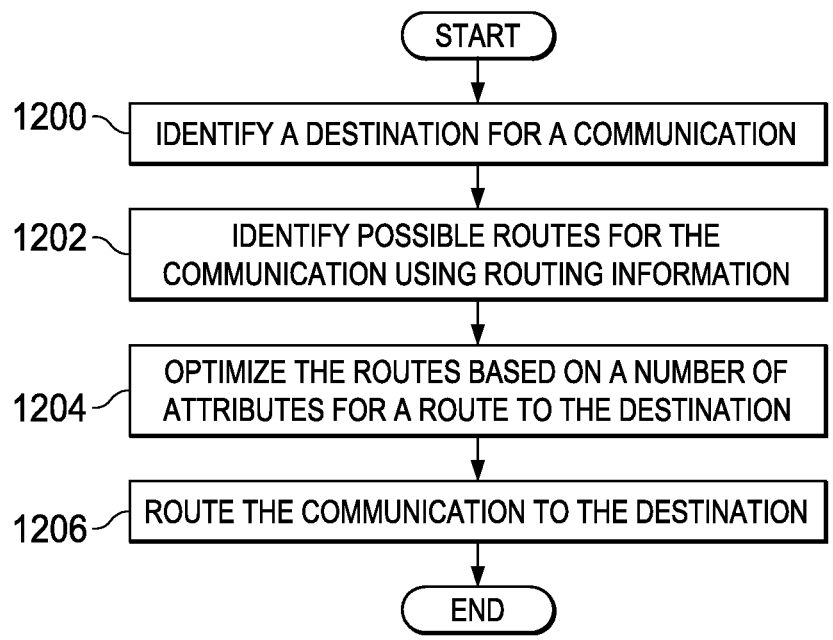
FIG. 12 is an illustration of a flowchart of a process for routing a communication accordance with an illustrative embodiment.

Turning now to FIG. 12, an illustration of a flowchart of a process for routing a communication is depicted in accordance with an illustrative embodiment. The process illustrated in FIG. 12 may be implemented in communications manager 300 in FIG. 3.

The process begins by identifying a destination for a communication (operation 1200). This destination may be one or more wireless communications units in a group of wireless communications units.

Next, the process identifies possible routes for the communication using routing information (operation 1202). This routing information may be contained in configuration information for destination wireless communication units. In these illustrative examples, when a change to the composition of the group of wireless communications units occurs, a change to the configuration information may also occur. Thus, routing information may change as the destination communications units change.

The process then optimizes the routes based on a number of attributes for a route to the destination (operation 1204). In these illustrative examples, the attributes in the number of attributes may be selected to avoid interference, send the communication quickly, reduce network resources used by sending the communication, or for some other suitable reason. The process then routes the communication to the destination (operation 1206), with the process terminating thereafter.

Figure 13:
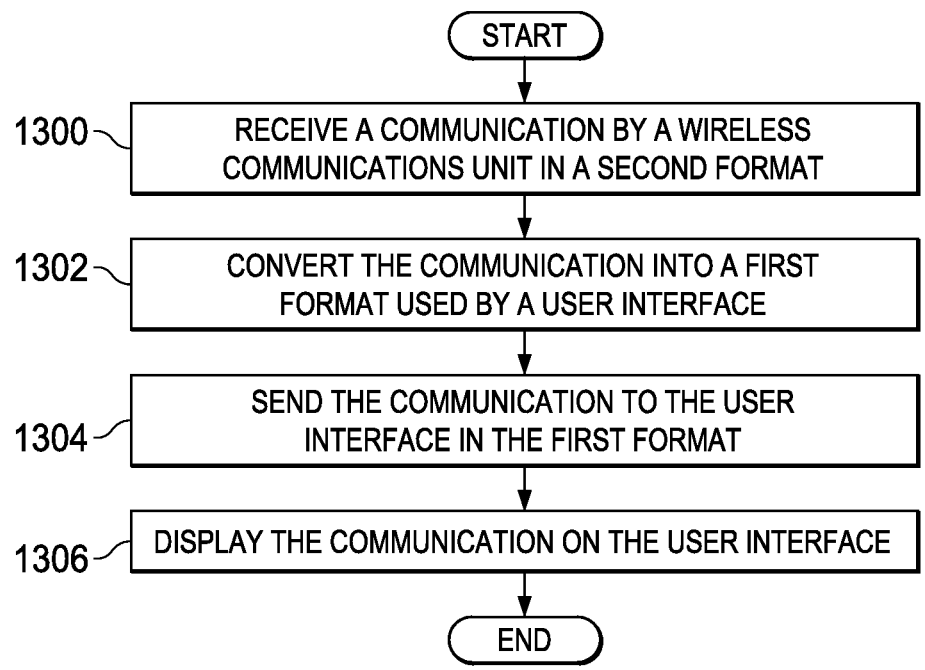
FIG. 13 is an illustration of a flowchart of a process for receiving a communication in accordance with an illustrative embodiment.

With reference now to FIG. 13, an illustration of a flowchart of a process for receiving a communication is depicted in accordance with an illustrative embodiment. The process illustrated in FIG. 13 may be implemented in communications manager 300 in FIG. 3.

The process begins by receiving a communication by a wireless communications unit in a second format (operation 1300). The second format may be the same format used to send input from a wireless communications unit in operation 809 in FIG. 9.

Next, the communication is converted into a first format used by a user interface (operation 1302). This first format may be the first format of input received by an operator in user interface 215 in operation 902 in FIG. 9.

The process then sends the communication to the user interface in the first format (operation 1304). Further, the process displays the communication on the user interface (operation 1306) with the process terminating thereafter. When displaying the communication to the user interface, the communication may be in the form of text, graphics, voice files, or other types of communication accessible to an operator of the user interface.

Figure 14:
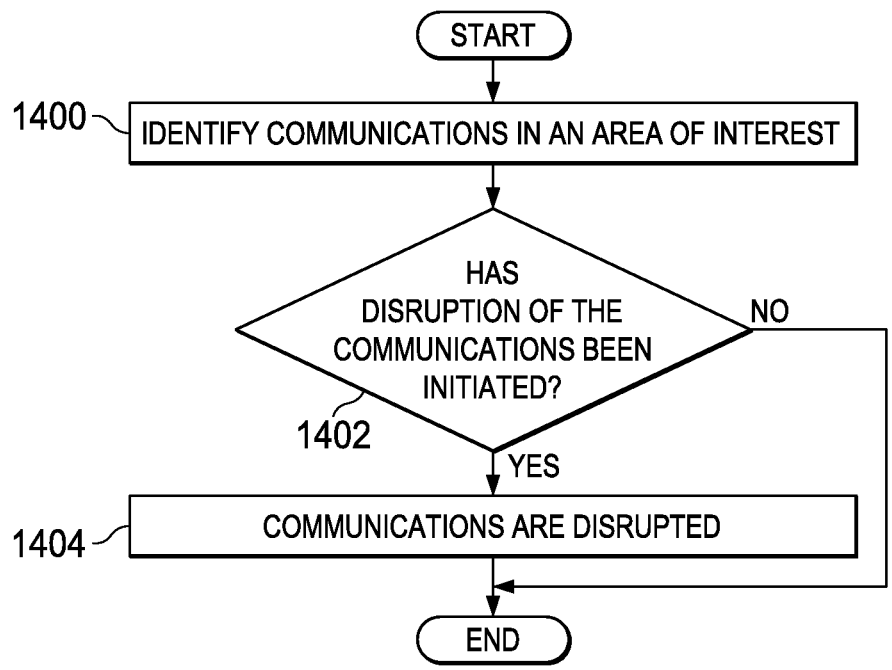
FIG. 14 is an illustration of a flowchart of a process for disrupting communications in accordance with an illustrative embodiment.

With reference now to FIG. 14, an illustration of a flowchart of a process for disrupting communications is depicted in accordance with an illustrative embodiment. The process illustrated in FIG. 14 may be implemented in communications manager 300 in FIG. 3.

The process begins by identifying communications in an area of interest (operation 1400). Next, a determination is made as to whether disruption of the communications has been initiated (operation 1402). For example, a command may be sent to communications disrupter 408 in communications manager 300 to disrupt digital communications such as those over a network. In these illustrative examples, disruption may be initiated by an operator automatically or in some other manner.

If disruption has been initiated, communications are disrupted (operation 1404), with the process terminating thereafter. This disruption may occur using various techniques such as a denial of service attack or other types of cyber-attacks. Otherwise, the process terminates.

Figure 15:
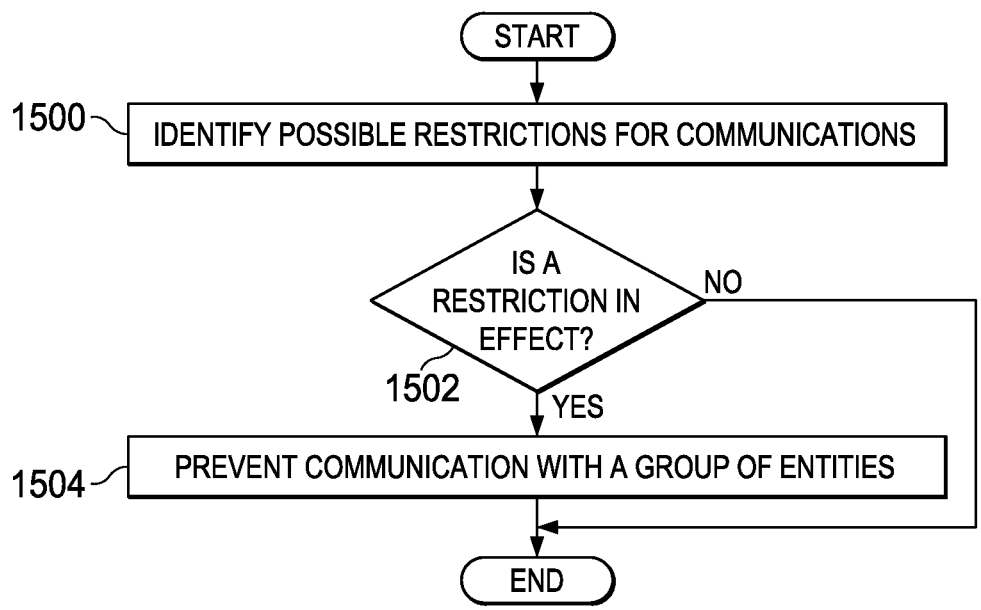
FIG. 15 is an illustration of a flowchart of a process for preventing communications in accordance with an illustrative embodiment.

Turning to FIG. 15, an illustration of a flowchart of a process for preventing communications is depicted in accordance with an illustrative embodiment. The process illustrated in FIG. 15 may be implemented in communications manager 300 in FIG. 3.

The process begins by identifying possible restrictions for communications (operation 1500). These restrictions may be restrictions implemented for specific frequency bands, entities, geographical areas, or for other reasons. A determination is then made as to whether a restriction is in effect (operation 1502). This restriction, for example, may be communications silence with a group of entities.

If a restriction is in effect, the process prevents communication with a group of entities (operation 1504) with the process terminating thereafter. In these illustrative examples, communications may be prevented using a device such as communications silence enforcer 406 in FIG. 4. If a restriction is not in effect, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
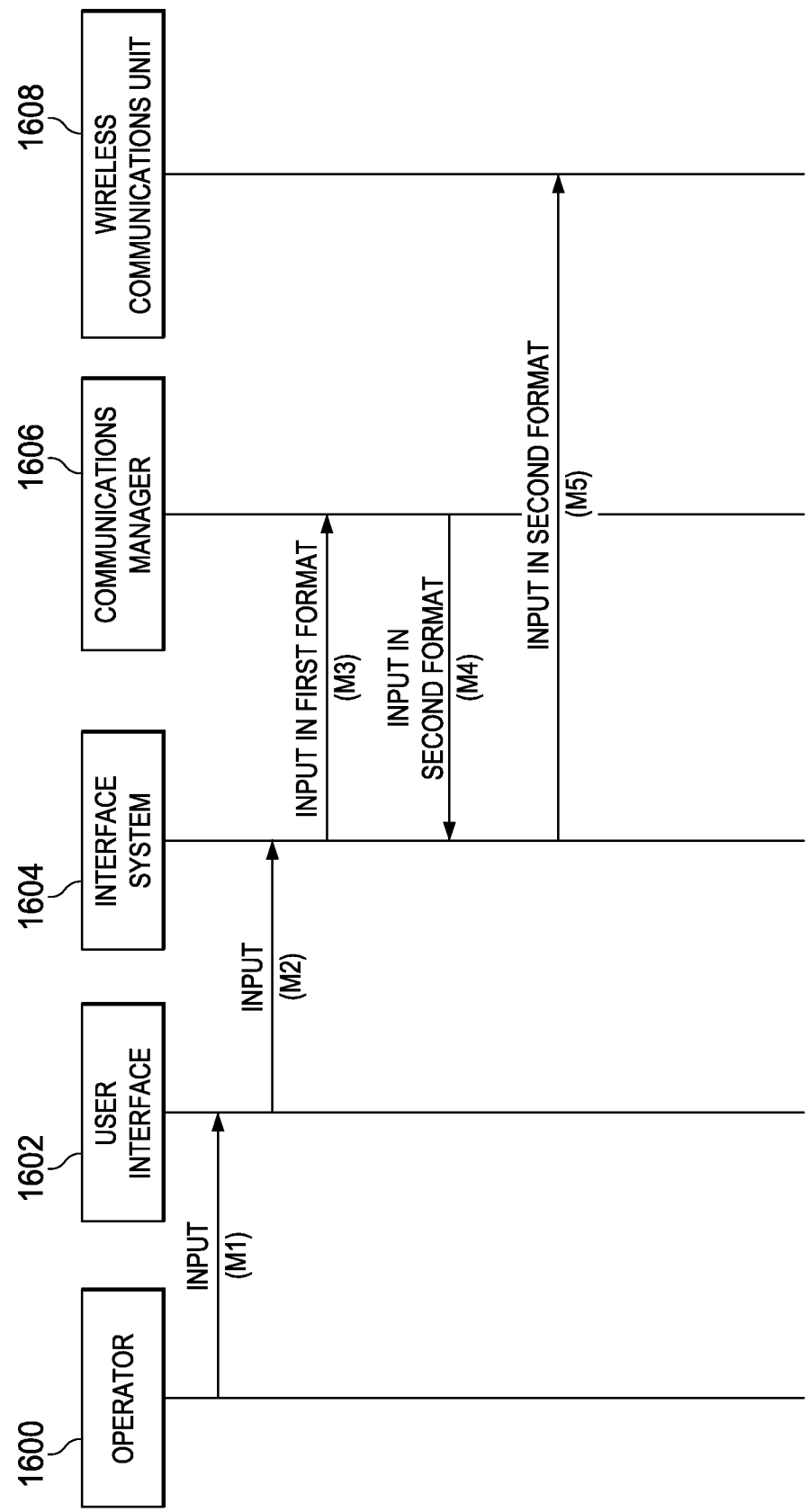
FIG. 16 is an illustration of a message flow diagram for managing communications in accordance with an illustrative embodiment.

Turning next to FIG. 16, an illustration of a message flow diagram for managing communications is depicted in accordance with an illustrative embodiment. In this example, the message flow diagram is an example of message flow that may be implemented in platform 200 in FIG. 2 to manage communications.

As depicted, the different components involved in the message flow include operator 1600, user interface 1602, interface system 1604, communications manager 1606, and wireless communications unit 1608. Operator 1600 may be, for example, a crew member, a pilot, a passenger, or some other person. User interface 1602 is an example of user interface 215 in FIG. 2. Interface system 1604 is an example of interface system 302 in FIG. 3. In this illustrative example, communications manager 1606 is an example of communications manager 300 in FIG. 3. As depicted, wireless communications unit 1608 is an example of a wireless communications unit in group of wireless communications units 206 in FIG. 2

In this example, operator 1600 generates input using interface system 1604 (message M1). The input generated may take various forms. For example, operator 1600 may use an input system to enter commands, data, and other information. The input system also may be used to generate communications such as voice, video, or some combination thereof.

User interface 1602 sends the input received from operator 1600 in a first format to interface system 1604 (message M2). In response to receiving the input in the first format, interface system 1604 sends the input in the first format to communications manager 1606 (message M3). In this illustrative example, instead of the input being sent directly to wireless communications unit 1608, communications manager 1606 intercepts the input.

Communications manager 1606 processes the input in the first format. In this illustrative example, the processing includes identifying wireless communications unit 1608 from a group of wireless communications units as the destination for the input. Communications manager 1606 identifies the second format for the input based on the identification of the wireless communications unit that is to receive the input. In other words, the second format is a format that is used by wireless communications unit 1608. Communications manager 1606 then converts the input from the first format to the second format. Communications manager 1606 sends the input in the second format to interface system 1604 (message M4).

In response to receiving the input in the second format, interface system 1604 relays the input in the second format to wireless communications unit 1608 (message M5).

In this manner, one or more illustrative embodiments abstract the functionality of performing communications operations to a higher level as compared to currently used hardware integration of radios into the avionics system. As a result, the cost of upgrades for wireless communications units may be reduced.

Figure 17:
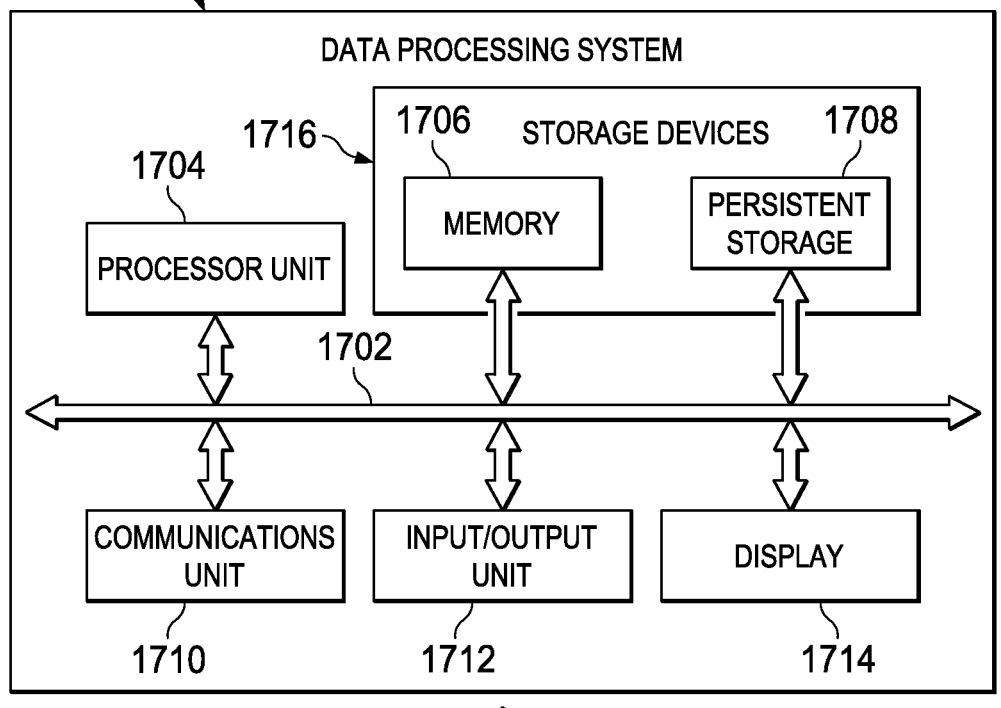
FIG. 17 is an illustration of a block diagram of a data processing system in accordance with an illustrative embodiment.
Figure 17:
Figure 17:
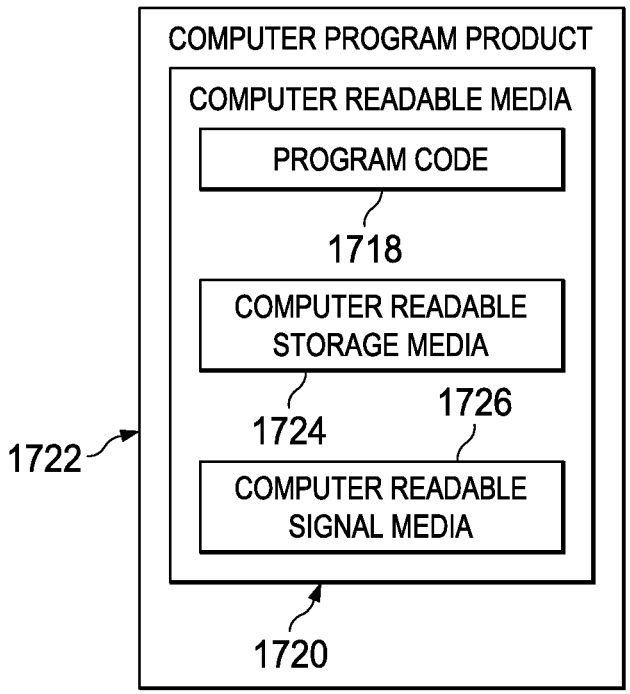

Turning now to FIG. 17, an illustration of a block diagram of a data processing system is depicted in accordance with an illustrative embodiment. Data processing system 1700 may be used to implement devices, such as communications switch 208 in FIG. 2. Data processing system 1700 may be used to implement a portion or all of communications switch 208. For example, data processing system 1700 may be used to implement communications manager 300 in communications switch 208 eight in FIG. 3. Additionally, data processing system 1700 also may be used in systems 203 in avionics system 202. In this illustrative example, data processing system 1700 includes communications fabric 1702, which provides communications between processor unit 1704, memory 1706, persistent storage 1708, communications unit 1710, input/output (I/O) unit 1712, and display 1714.

Processor unit 1704 serves to execute instructions for software that may be loaded into memory 1706. Processor unit 1704 may be a number of processors, a multi-processor core, or some other type of processor, depending on the particular implementation. A number, as used herein with reference to an item, means one or more items. Further, processor unit 1704 may be implemented using a number of heterogeneous processor systems in which a main processor is present with secondary processors on a single chip. As another illustrative example, processor unit 1704 may be a symmetric multi-processor system containing multiple processors of the same type.

Memory 1706 and persistent storage 1708 are examples of storage devices 1716. A storage device is any piece of hardware that is capable of storing information, such as, for example, without limitation, data, program code in functional form, and/or other suitable information either on a temporary basis and/or a permanent basis. Storage devices 1716 may also be referred to as computer readable storage devices in these examples. Memory 1706, in these examples may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these examples, provides for communications with other data processing systems or devices. In these examples, communications unit 1710 is a network interface card. Communications unit 1710 may provide communications through the use of either or both physical and wireless communications links.

Input/output unit 1712 allows for input and output of data with other devices that may be connected to data processing system 1700. For example, input/output unit 1712 may provide a connection for user input through a keyboard, a mouse, and/or some other suitable input device. Further, input/output unit 1712 may send output to a printer. Display 1714 provides a mechanism to display information to a user.

Instructions for the operating system, applications, and/or programs may be located in storage devices 1716, which are in communication with processor unit 1704 through communications fabric 1702. In these illustrative examples, the instructions are in a functional form on persistent storage 1708. These instructions may be loaded into memory 1706 for execution by processor unit 1704. The processes of the different embodiments may be performed by processor unit 1704 using computer implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these examples. In one example, computer readable media 1720 may be computer readable storage media 1724 or computer readable signal media 1726. Computer readable storage media 1724 may include, for example, an optical or magnetic disk that is inserted or placed into a drive or other device that is part of persistent storage 1708 for transfer onto a storage device, such as a hard drive, that is part of persistent storage 1708. Computer readable storage media 1724 also may take the form of a persistent storage, such as a hard drive, a thumb drive, or a flash memory, that is connected to data processing system 1700. In some instances, computer readable storage media 1724 may not be removable from data processing system 1700. In these illustrative examples, computer readable storage media 1724 is a non-transitory computer readable storage medium.

Alternatively, program code 1718 may be transferred to data processing system 1700 using computer readable signal media 1726. Computer readable signal media 1726 may be, for example, a propagated data signal containing program code 1718. For example, computer readable signal media 1726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in these illustrative examples.

In some illustrative embodiments, program code 1718 may be downloaded over a network to persistent storage 1708 from another device or data processing system through computer readable signal media 1726 for use within data processing system 1700. For instance, program code stored in a computer readable storage medium in a server data processing system may be downloaded over a network from the server to data processing system 1700. The data processing system providing program code 1718 may be a server computer, a client computer, or some other device capable of storing and transmitting program code 1718.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 1700 is any hardware apparatus that may store data. Memory 1706, persistent storage 1708, and computer readable media 1720 are examples of storage devices in a tangible form.

In another example, a bus system may be used to implement communications fabric 1702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1706, or a cache, such as found in an interface and memory controller hub that may be present in communications fabric 1702.

Thus, one or more illustrative embodiments provide a method and apparatus for managing communications in a communications system. With one or more illustrative embodiments, the expense and effort needed to change radios used in an aircraft are reduced. The illustrative embodiments use a communications switch that provides an interface between the radios and the avionics system of a platform such as an aircraft. The communications switch is configured to provide an interface for a group of wireless communication units such as a group of radios.

As described above, the composition of the group of radios may be changed to add radios, remove radios, or change the type of radios implemented in the aircraft. In these illustrative examples, the communications switch is configurable to control operation of the group of radios without changes to the graphical user interface displayed to the operator on a display system in the avionics system. Because changes to the avionics systems are reduced or avoided with use of an illustrative embodiment, the costs associated with reconfiguring or recertifying the aircraft may be reduced. Further, the addition, removal, or update of radios in the aircraft will take less time than with previously used techniques.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
  a plurality of wireless communications units on an aircraft, the wireless communications units being configured to be connected to a communication interface via a wired bus;
  an avionics system on the aircraft, the avionics system being configured to be connected to an avionics interface, the avionics system comprising a user interface, wherein the user interface comprises:
    a source field configured to select a source of communications for a communications operation;
    a destination field configured to select a destination for the communications operation; and
    a radio assignments field configured to display a wireless communications unit in the plurality of wireless communications units that is available for the communications operation based on the selected source and destination; and
  a communications manager configured to:
    identify the plurality of wireless communications units connected to the communications interface;
    receive the communications operation from the user interface in the avionics system via the avionics interface;
    identify the wireless communications unit displayed in the radio assignments field in the plurality of communications units connected to the communications interface; and
    control operation of the wireless communications unit to perform the communications operation.

2. The apparatus of claim 1, wherein the communications manager is further configured to:
  display the plurality of wireless communications units on the user interface;
  identify a number of entities available for communications from a group of entities for each wireless communications unit;
  and display the number of entities available for communications on the user interface.

3. The apparatus of claim 1, wherein the communications manager is configured to route communications between the plurality of wireless communications units and the avionics system using routing information in configuration information, wherein changes to a composition of the plurality of wireless communications units is supported by a change to the configuration information.

4. The apparatus of claim 1, wherein the communications manager is configured to route a communication to the destination based on optimizing a number of attributes for a route to the destination.

5. The apparatus of claim 4, wherein the communication is selected from at least one of a voice, a video, and data.

6. The apparatus of claim 1, wherein the communications manager is configured to send a voice communication as text.

7. The apparatus of claim 1, wherein the communications manager is configured to prevent communication with a group of entities when communications silence is in effect.

8. The apparatus of claim 1, wherein the communications manager is configured to operate the plurality of wireless communications units to disrupt communications in an area of interest.

9. The apparatus of claim 1, wherein the input for the communications operation is received from the user interface in a first format, and wherein the communications manager is configured to send the input to the plurality of wireless communications units in a second format for the plurality of wireless communications units.

10. The apparatus of claim 1, wherein the communications operation includes at least one of sending a communication and receiving a communication.

11. The apparatus of claim 1, wherein the plurality of wireless communications units is selected from at least one of a military standard 1553 radio, an Aeronautical Radio, Incorporated (ARINC) 429 radio, a satellite radio, and an optical communications unit.

12. A method for managing communications, the method comprising:

receiving input for a communications operation from a user interface in an avionics system connected to an avionics interface via a wired bus;

wherein the user interface comprises:

a source field configured to select a source of communications for the communications operation;

a destination field configured select a destination for the communications operation; and a radio assignments field configured to display a wireless communication unit in a plurality of wireless communications units that is available for the communications operation based on the selected source and destination;

identifying the wireless communications unit displayed in the radio assignments field in a plurality of wireless communications units connected to a communications interface; and controlling operation of the wireless communications unit to perform the communications operation.

13. The method of claim 12 further comprising:

displaying the plurality of wireless communications units on the user interface;

identifying a number of entities available for communications from a group of entities for each wireless communications unit; and displaying the number of entities available for communications on the user interface.

14. The method of claim 12 further comprising:

routing communications between the plurality of wireless communications units and the avionics system using routing information in configuration information, wherein changes to a composition of the plurality of wireless communications units is supported by a change to the configuration information.

15. The method of claim 12 further comprising:

routing a communication to a destination based on optimizing a number of attributes for a route to the destination.

16. The method of claim 12 further comprising:

sending a voice communication as text.

17. The method of claim 12 further comprising:

preventing communication with a group of entities when communications silence is in effect.

18. The method of claim 12 further comprising:

operating the plurality of wireless communications units to disrupt communications in an area of interest.

19. The method of claim 12, wherein the input for the communications operation is received in a first format and further comprising:

sending the input to the plurality of wireless communications units in a second format for the plurality of wireless communications units.

20. The method of claim 12, wherein the communications operation includes at least one of sending a communication and receiving a communication.

21. An apparatus comprising:

a plurality of wireless communications units on an aircraft, the wireless communications units configured to be connected to a communication interface via a wired bus on the aircraft; and an avionics system on the aircraft, the avionics system configured to be connected to the communications avionics interface, the avionics system comprising a user interface;

wherein the user interface comprises:

a source field configured to select a source of communications for a communications operation;

a destination field configured to select a destination for the communications operation; and a radio assignments field configured to display a wireless communications unit in the plurality of wireless communications units that is available for the communications operation based on the selected source and destination.

* * * * *